United States Patent [19]

Mason

[11] Patent Number: 5,376,736
[45] Date of Patent: Dec. 27, 1994

[54] TRANSPARENT POLYCARBONATE PET BLENDS

[75] Inventor: James P. Mason, McKees Rocks, Pa.

[73] Assignee: Miles Inc., Pittsburgh, Pa.

[21] Appl. No.: 226,901

[22] Filed: Apr. 12, 1994

Related U.S. Application Data

[63] Continuation-in-part of Ser. No. 93,834, Jul. 19, 1993, abandoned, which is a continuation-in-part of Ser. No. 14,901, Feb. 8, 1993, abandoned.

[51] Int. Cl.$^5$ .................. C08L 69/00; C08L 67/02
[52] U.S. Cl. .................. 525/439; 525/462; 525/469
[58] Field of Search .................. 525/439, 462, 469

[56] References Cited

U.S. PATENT DOCUMENTS 5,104,723 4/1992 Freitag et al. .................. 428/220
5,132,154 7/1992 Westeppe et al. .................. 428/65

*Primary Examiner*—David Buttner
*Attorney, Agent, or Firm*—Joseph C. Gil; Aron Preis

[57] ABSTRACT

Thermoplastic molding compositions are disclosed containing (i) about 1 to 89% polyethylene terephthalate (ii) about 10 to 89% of a first aromatic polycarbonate (PC1) and (iii) about 1–89% of the second aromatic polycarbonate (PC2). PC2 is a copolycarbonate which contains about 5 to 70 mole percent of structural units derived from a dihydroxy compound the bridging unit of which corresponds to

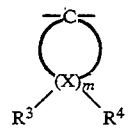

wherein $R^3$ and $R^4$ X and m are defined. A composition of the invention is characterized in a TLT value which is an improvement over that of the corresponding composition which contains the same amount of PET and only PC1. An additional embodiment of the invention concerns a method for increasing the TLT of a thermoplastic molding composition containing PET and PC1. The method comprises replacing some of said PC1 by PC2.

12 Claims, No Drawings

TRANSPARENT POLYCARBONATE PET BLENDS

CROSS-REFERENCE TO RELATED APPLICATION

This application is a continuation-in-part of application Ser. No. 08/093,834 filed Jul. 19, 1993 which in turn is a continuation-in-part of application Ser. No. 08/014,901, filed Feb. 8, 1993, both abandoned.

FIELD OF THE INVENTION

The invention relates to thermoplastic molding compositions and more particularly to compositions containing polyethylene terephthalate.

SUMMARY OF THE INVENTION

Thermoplastic molding compositions are disclosed containing (i) about 1 to 89% polyethylene terephthalate (ii) about 10 to 89% of a first aromatic polycarbonate (PC1) and (iii) about 1-89% of the second aromatic polycarbonate (PC2). PC2 is a copolycarbonate which contains about 5 to 70 mole percent of structural units derived from a dihydroxy compound the bridging unit of which corresponds to

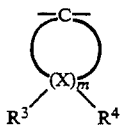

wherein $R^3$, $R^4$, X and m are defined.

A composition of the invention is characterized in a TLT value which is an improvement over that of the corresponding composition which contains the same amount of PET and only PC1. An additional embodiment of the invention concerns a method for increasing the TLT of a thermoplastic molding composition containing PET and PC1. The method comprises replacing some of said PC1 by PC2.

BACKGROUND OF THE INVENTION

Thermoplastic molding compositions are being used in a wide variety of applications because of their attractive profile of mechanical and physical properties. A key property for many applications is the transparency of the composition. Blends of polycarbonates (PC1) and polyethylene terephthalate (PET) are known and have been used in applications where enhanced chemical resistance is desired. It has been the experience of workers in the art that the TLT values of blends of PET and polycarbonate are lower than those of the individual components. A commercial product containing terephthalates of ethylene glycol and cyclohexane dimethanol and polycarbonate is noted for its transparency. The relevant art is noted to include U.S. Pat. No. 5,104,723 which disclosed blends of PET with polycarbonate resins which resins are derived from diphenols, the structure of which includes special cyclic bridging units (PC2). Also relevant is U.S. Pat. No. 5,132,154 which disclosed blends of such PC2 with conventional polycarbonates, that is PC1.

It is an object of the present invention to provide a method for increasing the TLT of a thermoplastic composition containing PET and polycarbonate resin.

It is a further object of the invention to provide thermoplastic compositions containing PET and (co)polycarbonate having improved TLT.

DETAILED DESCRIPTION OF THE INVENTION

The inventive thermoplastic molding compositions contains (i) about 1 to 89% polyethylene terephthalate (herein PET), (ii) about 10 to 89% of a first aromatic polycarbonate (PC1), and (iii) about 1-89% of the second aromatic polycarbonate (PC2).

A composition of the invention is characterized in a TLT value which is an improvement over that of the corresponding composition which contains the same amount of PET and only PC1. Preferably the compositions of the invention have TLT value greater than 80%.

The first aromatic polycarbonate resin is derived from dihydroxy compounds having no special cyclic bridging units (herein sometimes referred to as PC1) and the second aromatic polycarbonate resin is a co-polycarbonate which contains at least some structural units derived from a dihydroxy compound having special cyclic bridging units (herein sometimes referred to as PC2). It was surprisingly found that for a composition defined by fixed amount of PET, the balance being of PC1, the TLT value is increased by replacing a part of PC1 by PC2. Preferably, compositions prepared in accordance with the invention have TLT values higher than 80%.

The second aromatic polycarbonate resin (PC2) is a copolycarbonate which contains about 5 to 70 mole percent, preferably 10 to 55 mole percent of structural units derived from at least one dihydroxy compound which contains special cyclic bridging units, the remaining structural units are derived from any of the dihydroxy compounds noted earlier as the source for PC1.

The special bridging unit corresponds to

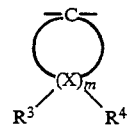

wherein $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms, and where m is an integer of 4 to 10.

The invention thus also relates to a method for increasing the TLT values of a thermoplastic molding composition which contains polyethylene terephthalate and said first polycarbonate resin. Increasing the TLT was found to result upon replacing some of said first aromatic polycarbonate resin by PC2.

The TLT value of the composition being determined in accordance with ASTM D-1003 using specimens 0.100" in thickness.

The polyethylene terephthalate useful in the present context is a well know thermoplastic resin which is readily available in commerce. It is derived from terephthalic acid and ethylene diol and is characterized in that its intrinsic viscosity is at least 0.4, preferably 0.4 to 1.4, most preferably 0.4 to 1.1 deciliter per gram, as measured in a 1 percent solution of phenol and tetrachloroethane (60:40) at 25° C. Optionally, the aromatic terephthalic acid component may be combined with up to 15 percent of additional acid component, including at least one of isophthalic acid, naphthalene-dicarboxylic acid, diphenylether dicarboxylic acid, diphenyldicarboxylic acid, diphenylsulphone dicarboxylic acid, and diphenoxyethane dicarboxylic acid. Also optional are hydroxycarboxylic acids which are not aromatic, including aliphatic dicarboxylic acids such as succinic acid, adipic acid and sebacic acid.

The diol component may contain in addition to ethylene glycol up to 15 percent relative to the molar amount of the glycol of co-diols. These include aliphatic diols having 3 to 8 carbon atoms, cycloaliphatic diols having 6 to 15 carbon atoms or aromatic diols having 6 to 21 carbon atoms. Examples of such co-diols include 3-methylpentane diol(2,4), 2-methyl-pentadiol-(1,4), 2,2,4-trimethylpentanediol-(1,3), 2-ethylhexanediol (1,3), 2,2-diethylpropanediol-(1,3), hexane diol(1,3), 1,4-di(hydroxyethoxy)benzene, 2,2-bis-(4-hydroxycyclohexyl)-propane, 2,4-hydroxy-1,1,3,3-tetramethylcyclobutane, 2,2-bis-(3-hydroxyethoxyphenylpropane, and 2,2-bis(4-hydroxypropoxyphenyl)-propane.

The polyesters may be branched by incorporating trihydric or tetrahydric alcohols or tribasic or tetrabasic acids of the type and in the manner known in the art. Chain terminators suitable in the preparation of such polyesters are also well known in the art.

Methods for the preparation of suitable polyester resin are known and have been described in U.S. Pat. Nos. 2,463,319 and 3,047,539 which are incorporated herein by reference. Most suitable in the present context is polyethylene terephthalate.

The first polycarbonate resin is derived from at least one dihydroxy compound conforming to formula (1) or (2)

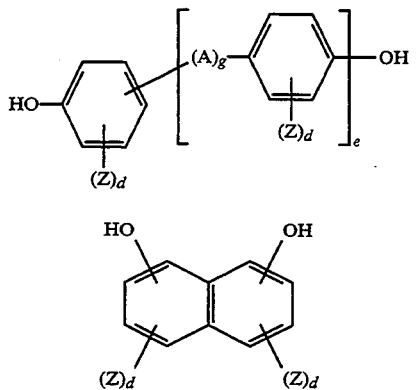

wherein A denotes an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a carbonyl group, an oxygen atom, —S—, —SO— or —SO₂— radical or a radical conforming to

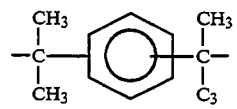

and wherein g denotes 0 or 1, e denotes 0 or 1, d denotes 0 to 4 and f denotes 0 to 3, and where the several Z substituents independently one of the other denotes F, Cl, Br or an alkyl group having 1 to 4 carbon atoms with the proviso that dihydroxydiphenyl cyclohexane conforming to formula (3) are excluded.

Among the useful dihydroxy compounds in the practice of the invention are hydroquinone, resorcinol, bis-(hydroxypheny) alkanes, bis-(hydroxyphenyl)-cycloalkanes, bis-(hydroxyphenyl)ethers, bis-(hydroxyphenyl)-ketones, bis-(hydroxyphenyl)sulfoxides. bis-(hydroxyphenyl)sulfones and 2,2-bis(hydroxyphenyl)-diisopropyl-benzenes. These and further suitable aromatic dihydroxy compounds are described. for example in U.S. Pat. Nos. 3,028,365, 2,999,835, 3,148,172, 3,271,368, 2,991,273, 3,271,367, 3,280,078, 3,014,891 and 2,999,846 (all incorporated herein by reference), in German Offenlegungsschriften (German Published Specifications) Nos. 1,570,703, 2,063,050, 2,063,052, 2,211,956 and 2,211,957 in French Patent Specification No. 1,561,418 and in the monograph, H. Schnell, Chemistry and Physics of Polycarbonates, Interscience Publishers, New York, 1964. Further examples of suitable bisphenols are 2,2-bis-(4-hydroxy-phenyl)-propane-(bisphenol A), 2,4-bis-(4-hydroxyphenyl)-2-methylbutane, 1,1-bis(4-hydroxyphenyl)-cyclohexane, 2,2-bis-(4-hydroxyphenyl)-p-diisopropyl-benzene, 2,2-bis(3-chloro-4-hydroxyphenyl)-propane, hydroxybenzophenone and 4,4'-sulfonyl diphenol.

The most preferred bisphenol is 2,2-bis-(4-hydroxyphenyl)propane (bisphenol A).

The polycarbonates of the invention may entail in their structure, units derived from one or more of the suitable bisphenols.

The preparation of polycarbonate resins may be carried out in accordance with any of the processes Known in the art, for example, by the interfacial polycondensation process in a homogeneous phase or by transesterification.

The suitable processes and the associated reactants catalysts, solvents and conditions are known in the art and have been described, inter alia, in German Patent Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 1,991,273.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol percent (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347, British Specification No. 1,079,821 and U.S. Pat. No. 3,544,514 (incorporated herein by reference).

Some examples of compounds with three or more than three phenolic hydroxyl groups which can be used are phloroglucinol, 4,6-dimenthyl-2,4,6-tri-(4-hydroxyphenyl)-heptane, 2,4,6-trimethyl-2,4,6,tri-(4-hydroxyphenyl)-heptane, 1,4,5-tri-(4-hydroxyphenyl)-benzene, 1,1,1-tri-(4-hydroxy-phenyl)-ethane, tri-(4-hydroxyphenyl)-phenylmethane, 2,2-bis[4,4-bis-(4-hydroxyphenyl)-cyclohexyl]-propane, 2,4-bis(4-hydroxyphenylisopropyl)-phenol, 6-bis(2-hydroxy-5'-methylbenzyl)-4-methylphenol, 2-(4-hydroxyphenyl)-2-(2,4-dihydroxyphenyl)propane, hexa(4-(4-hydroxyphenylisopropyl)-phenyl)orthoterephthalic acid ester, tetra-(4-hydroxyphenyl)-methane tetra-(4-(4-hydroxyphenylisopropyl)-phenoxy)methane and 1,4-bis-(4'-4"-dihydroxytriphenyl)-methyl)-benzene. Some of the other trifunctional compounds are 2,4-dihydroxy-benzoic acid, trimesic acid, dyanuric chloride and 3,3-bis-(4-hydroxyphenyl)-2-oxo-2,3-dihydroindole.

Among the resins suitable in the practice of the invention are included phenolphthalene based polycarbonate, copolycarbonates and terpolycarbonates such as are described in U.S. Pat. Nos. 3,036,036 and 4,210,741, both incorporated by reference therein.

The second aromatic polycarbonate resin contains about 5 to 70 mole percent, preferably 10 to 55 mole percent of structural units derived from at least one dihydroxy compound which contains said special cyclic bridging units, the remaining structural units are derived from any of the dihydroxy compounds noted earlier as the source for PC1. The dihydroxy compounds containing said special cyclic bridging units conform to formula (3)

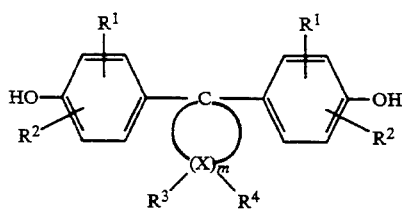

wherein $R^1$ and $R^2$ independently represent hydrogen, halogen, preferably chlorine or bromine, $C_{1-8}$ alkyl, $C_{5-6}$ cycloalkyl, $C_{6-10}$ aryl, preferably phenyl, and $C_{7-2}$ aralkyl, preferably phenyl-$C_{1-4}$ alkyl, in particular benzyl; m denotes an integer of 4 to 10, preferably 4–7; $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms. Preferably both $R^3$ and $R^4$ represent alkyl on one or 2× carbon atoms, most preferably only on one X carbon atom. Methyl is the preferred alkyl radical; the X atoms in the alpha position to the diphenyl substituted carbon atom (C-1) are preferably not dialkyl substituted; two alkyl substituents in the beta-position to C-1 is preferred.

Dihydroxydiphenylcyclohexanes having 5 or 6 ring carbon atoms in the cycloaliphatic radical (m represents 4 or 5 in general formula (I), for example, the diphenols:

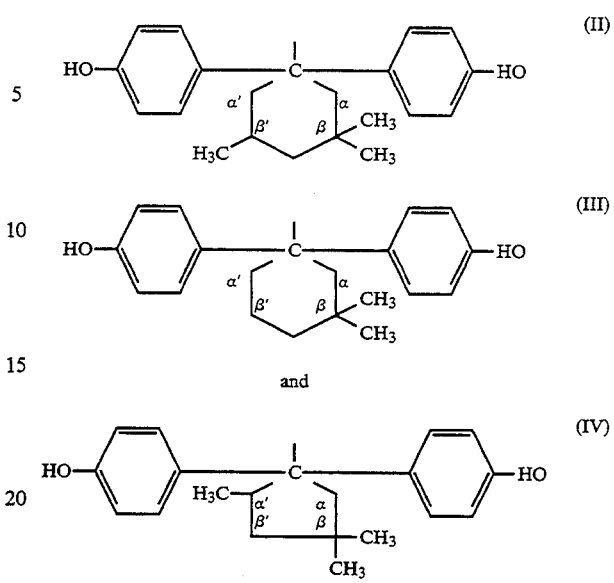

are preferred, 1,1-bis-(4-hydroxyphenyl)-3,3,5-trimethylcyclohexane (II) being particularly preferred.

The comonomers entailed in the preparation of the second aromatic polycarbonate of the invention may be any of the dihydroxy compound mentioned earlier in connection with PC1. The preparation of PC2 follows the same methods and the same monofunctional reactants and optional branching agents as mentioned earlier in connection with the preparation of PC1.

The invention is further illustrated but is not intended to be limited by the following examples in which all parts and percentages are by weight unless otherwise specified.

EXAMPLES

EXPERIMENTAL

Compositions in accordance with the invention have been prepared and their properties evaluated. The preparation of the compositions in a twin screw extruder followed conventional procedures, Test specimens measuring 0.100" (thickness) were molded by injection following conventional procedures, TLT values were determined following the procedure described in ASTM D-1003 using a Match-Scan I Spectrophotometer (Diano Corporation). The following materials were used in preparing the compositions described below: PET: a polyethyleneterephthalate having an intrinsic viscosity of about 1.0; a product of Eastman; Polycarbonate (PC1): a homopolycarbonate based on bisphenol-A, having a melt flow rate of 6.5; a product of Miles Inc.

A second polycarbonate resin (PC2) termed "D" below: a copolycarbonate based on bisphenol A and containing 55 mole % of structural units conforming to

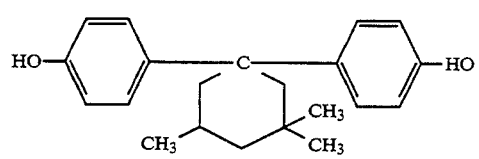

The table below summarized the results of the evaluations. The amount of each component is noted in percent relative to the weight of the composition.

| Composition | PET | PC | D | TLT |
|---|---|---|---|---|
| 1 | 0 | 50 | 50 | 89 |
| 2 | 10 | 90 | 0 | 82 |
| 3 | 10 | 72 | 18 | 86 |
| 4 | 10 | 50 | 40 | 87 |
| 5 | 10 | 18 | 72 | 86 |
| 6 | 20 | 80 | 0 | 74** |
| 7 | 20 | 55. | 25 | 84* |
| 8 | 20 | 25 | 55 | 82 |
| 9 | 25 | 75 | 0 | 70** |
| 10 | 25 | 37.5 | 37.5 | 84* |
| 11 | 30 | 70 | 0 | 66** |
| 12 | 30 | 63 | 7 | 72 |
| 13 | 30 | 42 | 28 | 82 |
| 14 | 30 | 35 | 35 | 82 |
| 15 | 30 | 0 | 70 | 67 |
| 16 | 33 | 52 | 15 | 74 |
| 17 | 33 | 35 | 32 | 80 |
| 18 | 33 | 19 | 48 | 82 |
| 19 | 33 | 67 | 0 | 64 |
| 20 | 40 | 60 | 0 | 64** |
| 21 | 40 | 30 | 30 | 84 |
| 22 | 50 | 50 | 0 | 65 |
| 23 | 50 | 40 | 10 | 76 |
| 24 | 50 | 25 | 25 | 82* |
| 25 | 50 | 10 | 40 | 76 |
| 26 | 50 | 0 | 50 | 64 |
| 27 | 70 | 30 | 0 | 71** |
| 28 | 70 | 27 | 3 | 72 |
| 29 | 70 | 17 | 13 | 83 |
| 30 | 70 | 0 | 30 | 72 |
| 31 | 90 | 7 | 3 | 81 |
| 32 | 90 | 10 | 0 | 76 |
| 33 | 100 | 0 | 0 | 78 |

*Average of a number of results.
**Calculated value

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition which exhibits an improvement in total tight transmission value comprising
  (i) about 1 to 89% polyethylene terephthalate,
  (ii) about 10 to 89% of the first aromatic polycarbonate, and
  (iii) about 1-89% of a second aromatic polycarbonate,
said first aromatic polycarbonate resin derived from a dihydroxy compound conforming to formula (1) or (2)

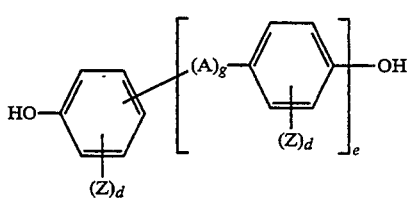

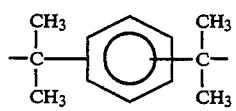

wherein A denotes an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a carbonyl group, an oxygen atom, —S—, —SO— or —SO$_2$— radical or a radical conforming to $$-\underset{\underset{CH_3}{|}}{\overset{\overset{CH_3}{|}}{C}}-\bigcirc-\underset{\underset{CH_3}{|}}{\overset{\overset{CH_3}{|}}{C}}-$$

and wherein g denotes 0 or 1, e denotes 0 or 1, d denotes 0 to 4 and f denotes 0 to 3, and where the several Z substituents independently one of the other denotes F, Cl, Br or an alkyl group having 1 to 4 carbon atoms, said second aromatic polycarbonate resin containing about 5 to 70 more percent of structural units derived from a dihydroxy compound having a cyclic bridging unit, said cyclic bridging unit corresponding to

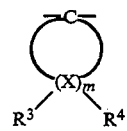

wherein R$^3$ and R$^4$ independently one of the other represent a hydrogen atom or a C$_{1-6}$ alkyl and X denotes carbon, with the proviso that R$^3$ and R$^4$ both represent an alkyl radical on at least one of the X carbon atoms, and where m is an integer of 4 to 10, said total tight transmission value determined in accordance with ASTM D-1003 using specimens 0.100" in thickness, said improvement being relative to the TLT of a composition containing a corresponding amount of PET and said first aromatic polycarbonate only.

2. The composition of claim 1 wherein said second aromatic polycarbonate resin containing 10 to 55 mole percent of structural units derived from said dihydroxy compound having said cyclic bridging units.

3. The composition of claim 1 wherein said m is an integer of 4 to 7.

4. The composition of claim 1 wherein said first aromatic polycarbonate is a homopolymer derived from a member selected from the group consisting of 2,2-bis-(4-hydroxyphenyl)-propane, 2,4-bis-(4-hydroxyphenyl)-2-methylbutane, 1,1 -bis(4-hydroxyphenyl)-cyclohexane, 2,2-bis-(4-hydroxyphenyl)-p-diisopropylbenzene, 2,2-bis(3-chloro-4-hydroxyphenyl)-propane, hydroxybenzophenone and 4,4'-sulfonyl diphenol.

5. The composition of claim 1 wherein said first aromatic polycarbonate is a homopolymer derived from 2,2-bis-(4-hydroxyphenyl)propane.

6. The composition of claim 1 wherein said second aromatic polycarbonate contains structural units derived from

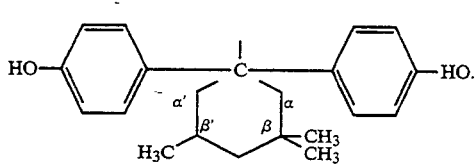
(II)

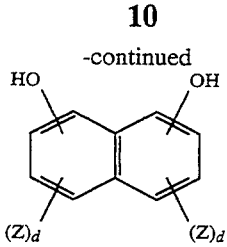
(2)

7. The composition of claim 1 wherein said second aromatic polycarbonate contains structural units derived from

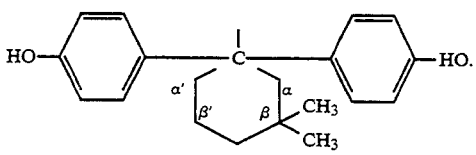
(III)

8. The composition of claim 1 wherein said second aromatic polycarbonate contains structural units derived from

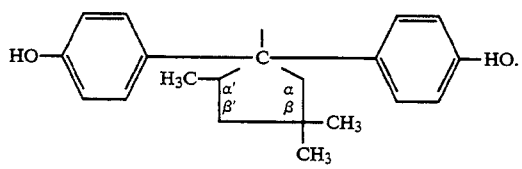
(IV)

9. A method for increasing the TLT value of a thermoplastic molding composition which contains 1-89% of polyethylene terephthalate the complementary balance being a first aromatic polycarbonate resin, comprising adding a second aromatic polycarbonate resin, said first aromatic polycarbonate resin derived from at least one dihydroxy compound conforming to formula (1) or (2)

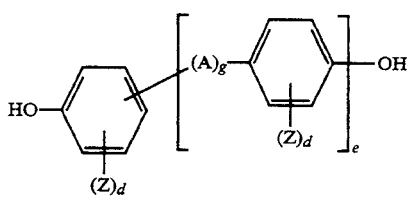
(1)

wherein A denotes an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, a carbonyl group, an oxygen atom, —S—, —SO— or —SO$_2$— radical or a radical conforming to

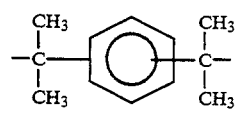

and wherein g denotes 0 or 1, e denotes 0 or 1, d denotes 0 to 4 and f denotes 0 to 3, and where the several Z substituents independently one of the other denotes F, Cl, Br or an alkyl group having 1 to 4 carbon atoms, said second aromatic polycarbonate being a copolycarbonate containing about 5 to 70 mole percent of structural units derived from from a dihydroxy compound having a cyclic bridging unit, said cyclic bridging unit corresponding to wherein $R^3$ and $R^4$ independently one of the other represent a hydrogen atom or a $C_{1-6}$ alkyl and X denotes carbon, with the proviso that $R^3$ and $R^4$ both represent an alkyl radical on at least one of the X carbon atoms, and where m is an integer of 4 to 10, said total tight transmission value being determined in accordance with ASTM D-1003 using specimens 0.100" in thickness, said portion being a positive amount which is less than the total amount of said first aromatic polycarbonate resin and the resulting TLT value being greater than the TLT value of a composition containing a corresponding amount of PET and said first polycarbonate only.

10. The composition prepared in accordance with the method of claim 9.

11. The composition of claim 1 having TLT value greater than 80%.

12. The composition of claim 10 having TLT value greater than 80%.

* * * * *